(12) United States Patent
Lin

(10) Patent No.: US 8,358,272 B2
(45) Date of Patent: Jan. 22, 2013

(54) COMPUTER KEYBOARD

(75) Inventor: Wei-Lung Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 863 days.

(21) Appl. No.: 12/501,483

(22) Filed: Jul. 12, 2009

(65) Prior Publication Data

US 2010/0060584 A1 Mar. 11, 2010

(30) Foreign Application Priority Data

Sep. 10, 2008 (CN) .......................... 2008 1 0304433

(51) Int. Cl.
*G06F 3/02* (2006.01)
(52) U.S. Cl. ...................................................... 345/168
(58) Field of Classification Search .......... 345/168–172; 710/67; 715/780; 341/22; 379/433.07; 400/485
See application file for complete search history.

(56) References Cited

U.S. PATENT DOCUMENTS 6,760,012 B1 * 7/2004 Laurila .......................... 345/169
6,809,725 B1 * 10/2004 Zhang ........................... 345/171

\* cited by examiner

*Primary Examiner* — Abbas Abdulselam
(74) *Attorney, Agent, or Firm* — Altis Law Group, Inc.

(57) ABSTRACT

A computer keyboard, comprising: an operation unit, a processing unit, an output unit, a query unit, and a display unit; wherein the operation unit comprises an editing key, a function key, the editing key is configured to respond to a user input to generate an editing information, the function key is configured to respond to the user input to control the computer keyboard entering an editing mode; and the processing unit is configured to transmit the editing information to an editing software via the output unit, when the computer keyboard is in the editing mode.

19 Claims, 4 Drawing Sheets

COMPUTER KEYBOARD

BACKGROUND

1. Technical Field

The disclosure relates to a computer keyboard.

2. Description of Related Art

In general, when users are using a word processing program, such as MICROSOFT WORD, for typing text in a foreign language, they may forget certain needed words, and how to spell them. To solve this problem, the user may have to use a language translation software to search for the word in their native language first, then get a translation and copy and paste the word to the document they are working on. The method works, however, it is time-consuming, and complex.

Therefore, what is needed is a computer keyboard with functions for easy searching for words in one language and applying them in another while writing or editing text.

DETAILED DESCRIPTION

Figure 1:
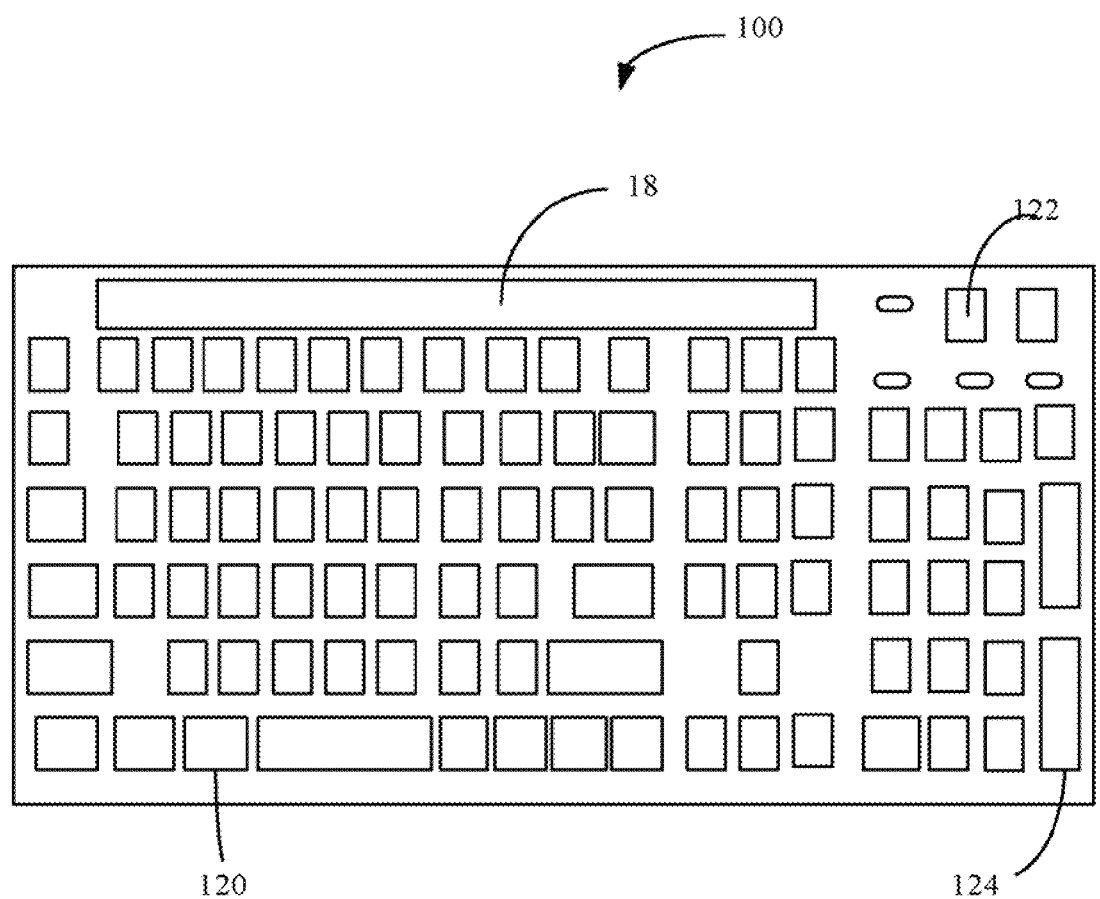
FIG. 1 is a schematic diagram of a computer keyboard in accordance with an exemplary embodiment.
Figure 2:
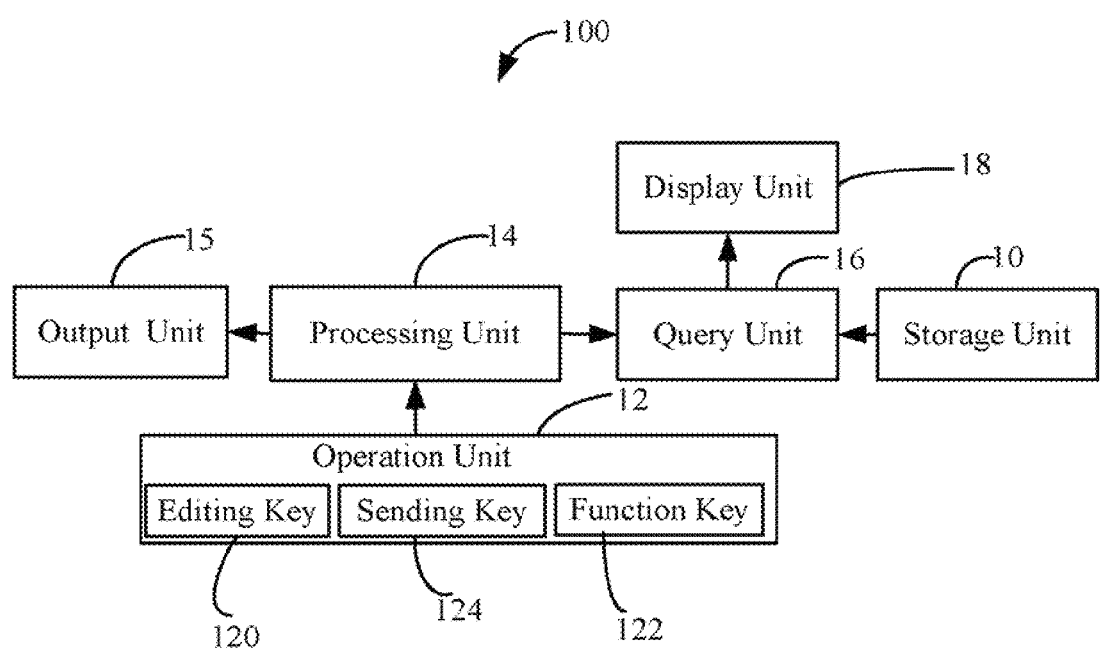
FIG. 2 is a block diagram of a hardware infrastructure of the computer keyboard of FIG. 1 in accordance with an exemplary embodiment.

Referring to FIG. 1, and FIG. 2, a computer keyboard 100 includes a storage unit 10, an operation unit 12, a processing unit 14, an output unit 15, a query unit 16, and a display unit 18. The computer keyboard 100 has an editing mode and a translation mode. In the editing mode, the computer keyboard 100 receives a user input, generates an editing information corresponding to the user input, and transmits the editing information to an editing software of a computer. The editing information may be, but is not limited to, characters, words, symbolic information, and a combination thereof. The editing software may be, but is not limited to, text editing software, spreadsheet software, etc. In the translation mode, the computer keyboard 100 receives the user input, generates the editing information corresponding to the user input, translates the editing information, and transmits the editing information or the translation result, according to a sending instruction, to the editing software of the computer. The editing mode can be switched to the translation mode, and vice versa.

The storage unit 10 is configured to store a dictionary application which has a plurality of translation functions, such as, Chinese-to-English (C-E) translation, English-to-Chinese (E-C) translation, and so on. Simultaneously, the dictionary application further has a translation function which can search for a word in their native language. In another embodiment, the dictionary application may also be stored in a network, and the storage unit 10 is not needed in the computer keyboard 100.

The operation unit 12 includes an editing key 120, a function key 122, and a sending key 124. The editing key 120 is configured to respond to the user input to generate the editing information. The function key 122 is configured to respond to the user input to control the computer keyboard 100 to switch from the editing mode to the translation mode or from the translation mode to the editing mode. In the exemplary embodiment, the function key 122 is further configured to transmit the editing information to the output unit 15 or the query unit 16 according to the current mode of the computer keyboard 100.

The processing unit 14 is configured to output the editing information to the editing software of the computer via the output unit 15, when the computer keyboard 100 is in the editing mode. The editing mode is described in more detail in later paragraphs in reference to FIG. 3.

The processing unit 14 is further configured to transmit the editing information to the query unit 16, when the computer keyboard 100 is in the translation mode. The query unit 16 is configured to translate the editing information via the dictionary application to generate a translation result, and display the editing information and the translation result on the display unit 18. The display unit 18 may be a liquid crystal display (LCD) display screen.

The sending key 124 is configured to generate a first sending instruction and a second sending instruction according to the user input. The sending key 124 generates the first sending instruction if a period of the sending key 124 that is pressed is greater than a predetermined time; the sending key 14 generates the second sending instruction if the period of the sending key 124 that is pressed is less than the predetermined time. In other embodiments, the sending key 124 may include two keys: a first key and a second key. The first sending instruction is generated if the first key is pressed; the second sending instruction is generated if the second key is pressed.

The processing unit 14 is configured to acquire the editing information from the query unit 16 according to the first sending instruction and transmit the editing information to the editing software of the computer via the output unit 15, when the computer keyboard 100 is in the translation mode. The translation mode is described in more detail in later paragraphs in reference to FIG. 4.

Figure 3:
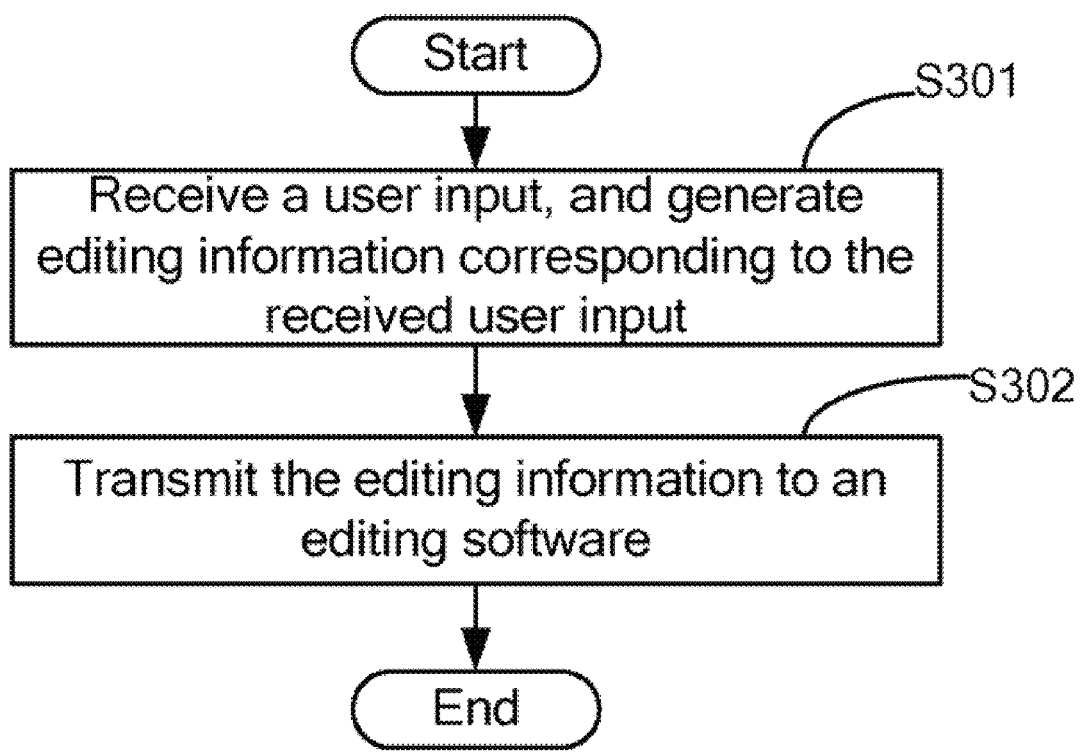
FIG. 3 is a flowchart of a user input processing method implemented by the computer keyboard of FIG. 2 which is in an editing mode in accordance with an exemplary embodiment.

FIG. 3 is a flowchart of a user input processing method implemented by the computer keyboard 100 which is in the editing mode in accordance with an exemplary embodiment.

In step S301, the editing key 120 receives the user input, and generates an editing information corresponding to the received user input.

In step S302, the processing unit 14 transmits the editing information to the editing software of the computer via the output unit 15.

Figure 4:
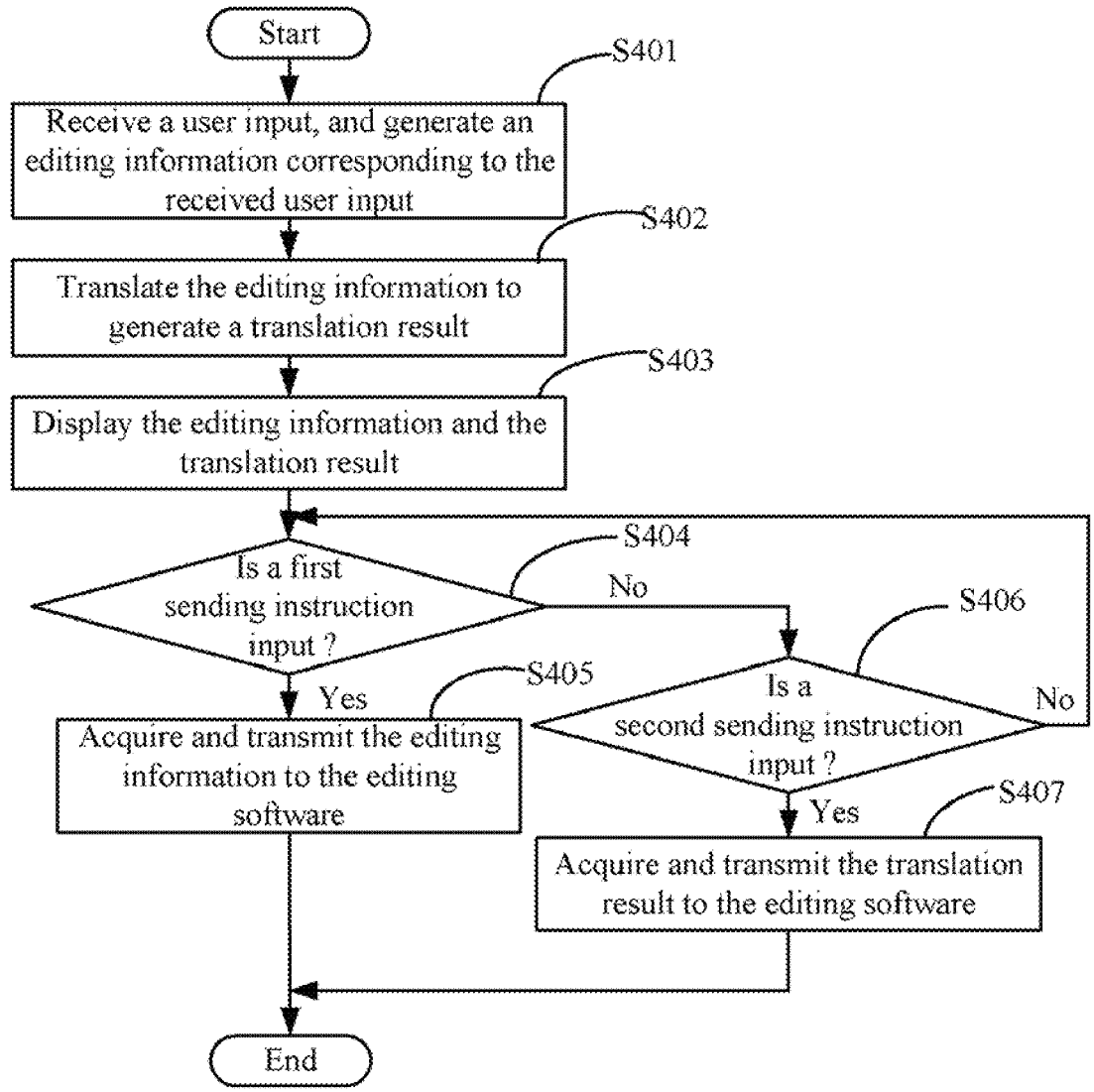
FIG. 4 is a flowchart of a user input processing method implemented by the computer keyboard of FIG. 2 which is in a translation mode in accordance with an exemplary embodiment.

FIG. 4 is a flowchart of a user input processing method implemented by the computer keyboard 100 which is in the translation mode in accordance with an exemplary embodiment.

In step S401, the editing key 120 receives the user input, and generates the editing information corresponding to the received user input.

In step S402, the query unit 16 translates the editing information via the dictionary application to generate the translation result.

In step S403, the query unit 16 displays the editing information and the translation result on the display unit 18.

In step S404, the processing unit 14 identifies whether the first sending instruction is input, if so, continues to step S405, if not, returns to step S406.

In step S405, the processing unit 14 acquires and transmits the editing information to the editing software of the computer.

In step S406, the processing unit 14 identifies whether the second sending instruction is input, if so, continues to step S407, if not, returns to step S404.

In step S407, the processing unit 14 acquires and transmits the translation result to the editing software of the computer.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A computer keyboard, comprising:
   an operation unit, a processing unit, an output unit, a query unit, and a display unit;
   wherein the operation unit comprises an editing key, a function key, and a sending key; the editing key is configured to respond to a user input to generate an editing information, the function key is configured to respond to the user input to control the computer keyboard entering an editing mode or a translating mode, the sending key is configured to respond to the user input to generate a sending instruction when the computer keyboard is in the translating mode; the processing unit is configured to transmit the editing information to an editing software via the output unit, when the computer keyboard is in the editing mode; the query unit is configured to translate the editing information via a dictionary application to generate a translation result, and display the editing information and the translation result on the display unit; and the processing unit is further configured to acquire and transmit the editing information or the translation result to the editing software according to the sending instruction.

2. The computer keyboard as described in claim 1, wherein the function key is further configured to respond to the user input to switch the computer keyboard between the editing mode and the translation mode.

3. The computer keyboard as described in claim 1, wherein the sending instruction comprises a first sending instruction and a second sending instruction, the processing unit is further configured to acquire and transmit the editing information to the editing software via the output unit according to the first sending instruction; and acquire and transmit the translation result to the editing software via the output unit according to the second sending instruction.

4. The computer keyboard as described in claim 3, wherein the first sending instruction is generated if a period of the sending key that is pressed is greater than a predetermined time; the second sending instruction is generated if the period of the sending key that is pressed is less than the predetermined time.

5. The computer keyboard as described in claim 3, wherein the sending key includes two keys: a first key and a second key; the first sending instruction is generated if the first key is pressed, and the second sending instruction is generated if the second key is pressed.

6. The computer keyboard as described in claim 1, the editing information are characters, words, symbolic information, and a combination thereof.

7. The computer keyboard as described in claim 1, wherein the computer keyboard further includes a storage unit, the dictionary application was stored in the storage unit or on a network.

8. A computer keyboard, comprising: an operation unit, a processing unit, an output unit, a query unit, and a display unit;
   wherein the operation unit comprises an editing key, a function key, and a sending key; the editing key is configured to respond to a user input to generate an edit information; the function key is configured to respond to the user input to control the computer keyboard entering a translation mode; the sending key is configured to respond to the user input to generate a sending instruction; and the query unit is configured to translate the editing information via a dictionary application to generate a translation result, display the editing information and the translation result on the display unit, acquire and transmit the editing information or the translation result to the editing software according to the sending instruction, when the computer keyboard is in the translating mode.

9. The computer keyboard as described in claim 8, wherein the function key is further configured to control the computer keyboard entering an editing mode; and the processing unit is configured to transmit the editing information to an editing software via the output unit, when the computer keyboard is in the editing mode.

10. The computer keyboard as described in claim 9, wherein the function key is further configured to respond to the user input to switch the computer keyboard between the translation mode and the editing mode.

11. The computer keyboard as described in claim 8, wherein the sending instruction includes a first sending instruction and a second sending instruction, the processing unit is configured to acquire and transmit the editing information to the editing software via the output unit according to the first sending instruction, and to acquire and transmit the translation result to the editing software via the output unit according to the second sending instruction.

12. The computer keyboard as described in claim 11, wherein the first sending instruction is generated if a period of the sending key that is pressed is greater than a predetermined time; the second sending instruction is generated if the period of the sending key that is pressed is less than the predetermined time.

13. The computer keyboard as described in claim 11, wherein the sending key includes two keys: a first key and a second key, the first sending instruction is generated if the first key is pressed; the second sending instruction is generated if the second key is pressed.

14. The computer keyboard as described in claim 8, the editing information are characters, words, symbolic information, and a combination thereof.

15. The computer keyboard as described in claim 8, wherein the computer keyboard further includes a storage unit, the dictionary application was stored in the storage unit or on a network.

16. A processing method implemented by a computer keyboard, comprising:
   generating an editing information via an editing key in response to a user input;
   controlling the computer keyboard to enter a translation mode in response to the user input via a function key; and
   translating the editing information via a dictionary application to generate a translation result when the computer keyboard is in the translation mode, displaying the editing information and the translation result, and transmitting the editing information or the translation result to the editing software according to a sending instruction in response to the user input via a sending key.

17. The processing method as described in claim 16, further comprising:

controlling the computer keyboard to enter an editing mode in response to the user input via the function key; and transmitting the editing information to the editing software via the output unit when the computer keyboard is in the editing mode.

18. The processing method as described in claim 16, further comprising:

switching the computer keyboard between the translation mode and the editing mode in response to the user input via the function key.

19. The processing method as described in claim 16, wherein the sending instruction comprises a first sending instruction and a second sending instruction, further comprising:

acquiring and transmitting the editing information to the editing software according to the first sending instruction; and acquiring and transmitting the translation result to the editing software according to the second sending instruction.

* * * * *